(12) United States Patent
Potentier

(10) Patent No.: US 10,781,791 B2
(45) Date of Patent: Sep. 22, 2020

(54) DEVICE FOR MOUNTING TO A WIND TURBINE BLADE AND METHOD OF MOUNTING THE DEVICE

(71) Applicant: Vestas Wind Systems A/S, Aarhus N. (DK)

(72) Inventor: Thomas Potentier, Southampton (GB)

(73) Assignee: Vestas Wind Systems A/S, Aarhus N. (DK)

( * ) Notice: Subject to any disclaimer, the term of this patent is extended or adjusted under 35 U.S.C. 154(b) by 94 days.

(21) Appl. No.: 16/330,995

(22) PCT Filed: Sep. 7, 2017

(86) PCT No.: PCT/DK2017/050284
§ 371 (c)(1),
(2) Date: Mar. 6, 2019

(87) PCT Pub. No.: WO2018/046069
PCT Pub. Date: Mar. 15, 2018

(65) Prior Publication Data
US 2019/0234375 A1      Aug. 1, 2019

(30) Foreign Application Priority Data

Sep. 9, 2016   (DK) .................................. 2016 70692

(51) Int. Cl.
*F03D 1/06*      (2006.01)
*F04D 29/66*     (2006.01)

(52) U.S. Cl.
CPC ........... *F03D 1/0675* (2013.01); *F03D 1/065* (2013.01); *F03D 1/0633* (2013.01);
(Continued)

(58) Field of Classification Search
CPC .... F03D 1/0658; F03D 1/0675; F03D 1/0641; F03D 1/0683; F05D 2240/304; F05D 2260/96; F05B 2260/96; F04D 29/667
See application file for complete search history.

(56) References Cited

U.S. PATENT DOCUMENTS 5,711,653 A    1/1998  McCabe
6,010,307 A    1/2000  McCabe
(Continued)

FOREIGN PATENT DOCUMENTS

CN     1641213 A     7/2005
EP     2027390 A1    2/2009
(Continued)

OTHER PUBLICATIONS

Danish Patent and Trademark Office, Search and Examination Report in PA 2016 70692, dated Feb. 27, 2017.
(Continued)

*Primary Examiner* — Justin D Seabe
*Assistant Examiner* — Andrew J Marien
(74) *Attorney, Agent, or Firm* — Wood Herron & Evans LLP

(57) ABSTRACT

A device for attaching to a surface of a wind turbine blade is described. The device comprises a plurality of sections to be arranged end-to-end along a portion of the blade. Each section of the device comprises: a baseplate for bonding to the surface of the blade; a first panel extending from the baseplate; first and second end walls extending respectively along transverse edges of the baseplate and the first panel; a first tab extending from the first end wall; and a second tab extending from the second end wall, the second tab being transversely offset from the first tab. The tabs are arranged such that when the sections are positioned end-to-end with a first end wall of a first section adjacent to a second end wall
(Continued)

of a second section, the first tab of the first section overlaps the second end wall of the second section, whilst the second tab of the second section overlaps the first end wall of the first section. An associated method of mounting the device is also described, which avoids the risk of compromising adhesive and/or sealant during the mounting process.

15 Claims, 8 Drawing Sheets

(52) U.S. Cl.
CPC ......... *F03D 1/0641* (2013.01); *F03D 1/0683* (2013.01); *F04D 29/667* (2013.01); *F05B 2230/60* (2013.01); *F05B 2230/80* (2013.01); *F05B 2240/221* (2013.01); *F05B 2240/30* (2013.01); *F05B 2260/96* (2013.01); *F05D 2240/304* (2013.01); *F05D 2260/96* (2013.01); *Y02E 10/721* (2013.01); *Y02P 70/523* (2015.11)

(56) References Cited

U.S. PATENT DOCUMENTS

| | | | | |
|---|---|---|---|---|
| 2011/0142637 A1* | 6/2011 | Riddell | ................ | F03D 1/0633 416/62 |
| 2012/0141269 A1* | 6/2012 | Giguere | ................ | F03D 1/0633 416/1 |
| 2012/0189455 A1 | 7/2012 | Enevoldsen et al. | | |
| 2017/0241400 A1* | 8/2017 | Whitehouse | .......... | F03D 1/0641 |

FOREIGN PATENT DOCUMENTS

| | | |
|---|---|---|
| EP | 2343451 A1 | 7/2011 |
| EP | 2631467 A1 | 8/2013 |
| EP | 2647835 A1 | 10/2013 |
| WO | 2015185062 A1 | 12/2015 |
| WO | 2016055076 A1 | 4/2016 |
| WO | 2017088880 A1 | 6/2017 |

OTHER PUBLICATIONS

European Patent Office, International Search Report and Written Opinion in PCT Application No. PCT/DK2017/050284, dated Dec. 5, 2017.

China National Intellectual Property Administration, First Notification of Office Action in CN Application No. 201780062136.7, dated Dec. 10, 2019.

* cited by examiner

DEVICE FOR MOUNTING TO A WIND TURBINE BLADE AND METHOD OF MOUNTING THE DEVICE

TECHNICAL FIELD

The present invention relates generally to wind turbine blades, and more specifically to a device for mounting to a surface of the blade in order to, for example, improve the performance of the blade. The invention also relates to a method of mounting the device to a wind turbine blade.

BACKGROUND

There is a continual desire to improve the performance of wind turbine blades. In this respect it is known to mount aerodynamic devices such as vortex generators, trailing edge flaps and serrated trailing edge devices to the surface of blades. These devices are typically provided to reduce stall, increase lift and/or to reduce noise emissions from the blade.

The aerodynamic devices may be mounted to the blade during manufacture of the blade, or as a retrofit to existing blades. When mounting the devices as a retrofit it is often necessary to mount the devices in the field, which presents a number of technical challenges.

The devices typically comprise a baseplate, which may be bonded to the surface of the blade using adhesive. A sealant may also be provided around the edge of the baseplate, as described in applicant's European Patent EP2027390B.

In order to ensure a strong and durable attachment to the blade surface it is important to ensure that the adhesive and/or the sealant are not compromised during mounting of the device. Once the device is placed in contact with the blade surface it generally cannot be moved without compromising the adhesive. It is therefore important to ensure the device is positioned accurately before the baseplate is pressed against the blade surface. It will be appreciated that this is particularly challenging when mounting devices to blades in the field.

Often the aerodynamic devices are formed from a number of sections which are arranged side-by-side along the length of the whole or part of the blade. Forming the devices in sections facilitates manufacture of the devices and makes the devices easier to handle and mount to the blades, particularly when the devices are to be retrofitted to blades in the field.

One problem with devices installed in a number of sections is that there can be small gaps between adjacent sections. These gaps may be present at the time of installation, or they may develop over time as the devices may bend or distort in use. The presence of gaps between sections can reduce the performance of the device, for example in the case of lift-enhancing flaps such as Gurney flaps, it can result in air leakage between the sections. This leakage of air may result in a loss of power and can increase noise emissions from the blade caused by air 'whistling' through the gaps.

Against this background, the present invention aims to provide an improved aerodynamic device that does not suffer from one or more of the problems described above.

SUMMARY OF THE INVENTION

According to a first aspect of the present invention, there is provided a device for attaching to a surface of a wind turbine blade. The device comprises a plurality of sections to be arranged end-to-end along a portion of the blade. Each section of the device comprises: a baseplate for bonding to the surface of the blade; a first panel extending from the baseplate; first and second end walls extending respectively along transverse edges of the baseplate and the first panel; a first tab extending from the first end wall; and a second tab extending from the second end wall, the second tab being transversely offset from the first tab. The tabs are arranged such that when the sections are positioned end-to-end with a first end wall of a first section adjacent to a second end wall of a second section, the first tab of the first section overlaps the second end wall of the second section, whilst the second tab of the second section overlaps the first end wall of the first section.

The tabs of a flap section advantageously interlock with the tabs of adjacent flap sections. The interlocking tabs cover any gaps between adjacent flap sections. This avoids power losses and noise that may otherwise be caused by air escaping through those gaps.

In preferred embodiments of the invention, the device is a trailing edge flap, for example a so-called Gurney flap. The panel may therefore be a flap. In other embodiments, the device may be another 'add-on' device, for example a device that extends the chord of a blade, or a device that includes serrations.

The device is preferably arranged to be mounted at or near to the trailing edge of the blade. Preferably the device is configured for mounting to a pressure surface of the blade.

One or more of the sections preferably comprises a second panel extending from the first panel. The first and second panels may form a V-shape in cross-section. In certain embodiments one or more of the sections may include more than two panels, for example three or more panels arranged to define a zig-zag profile in cross-section.

The first tab, or at least a portion of the first tab, may extend from a portion of the first end wall that is contiguous with the baseplate. The second tab, or at least a portion of the second tab, may extend from a portion of the second end wall that is contiguous with the panel(s).

The first tab, or at least a portion of the first tab, may be provided in a plane that is substantially parallel to, and spaced apart from, the plane of the baseplate.

The second tab, or at least a portion of the second tab, may be provided in a plane that is substantially parallel to, and spaced apart from, the plane of the first panel.

A portion of the second tab may be provided in a plane that is substantially parallel to, and spaced apart from, the plane of the second panel.

The second tab may be substantially V-shaped in cross-section.

The first tab may have a curved end portion near a leading edge of the baseplate.

The baseplate may comprise an outer surface defining a mounting region for adhesively bonding to the surface of the blade. The outer surface of the baseplate may further comprise a sealing region at least partially surrounding the mounting region. The outer surface of the baseplate may further comprise a barrier between the mounting region and the sealing region. The barrier may comprise a ridge or a series of ridges.

A rear surface of each section may include a longitudinally-extending channel at a boundary between the baseplate and the first panel.

Each section of the device may comprise a first locating feature on the first end wall and a second locating feature on the second end wall. The first locating feature may be configured to locate with the second locating feature of an adjacent section and the second locating feature may be configured to locate with the first locating feature of an adjacent section.

The inventive concept includes a wind turbine blade comprising the device bonded to an outer surface of the blade.

According a second aspect of the present invention, there is provided a method of mounting the device to a surface of a wind turbine blade. The method comprises: providing first and second sections of the device; bonding the first section of the device to the outer surface of the blade; providing adhesive and/or sealant on an outer surface of the baseplate of the second section and/or on the outer surface of the blade; locating the second section of the device adjacent to the first section such that adjacent end surfaces of the first and second sections are in contact or close together and the second section is inclined relative to the first section such that the baseplate is not in bonding contact with the outer surface of the blade; and pivoting the second section such that the baseplate is moved into bonding contact with the outer surface of the blade, wherein pivoting the second section causes the first tab of the first section to overlap the second end wall of the second section, and the second tab of the second section to overlap the first end wall of the first section.

As discussed in detail later, the method allows adjacent sections of the device to be positioned close together and mounted to the surface of the blade without compromising the adhesive used to bond the device to the blade surface.

DETAILED DESCRIPTION

Figure 1:
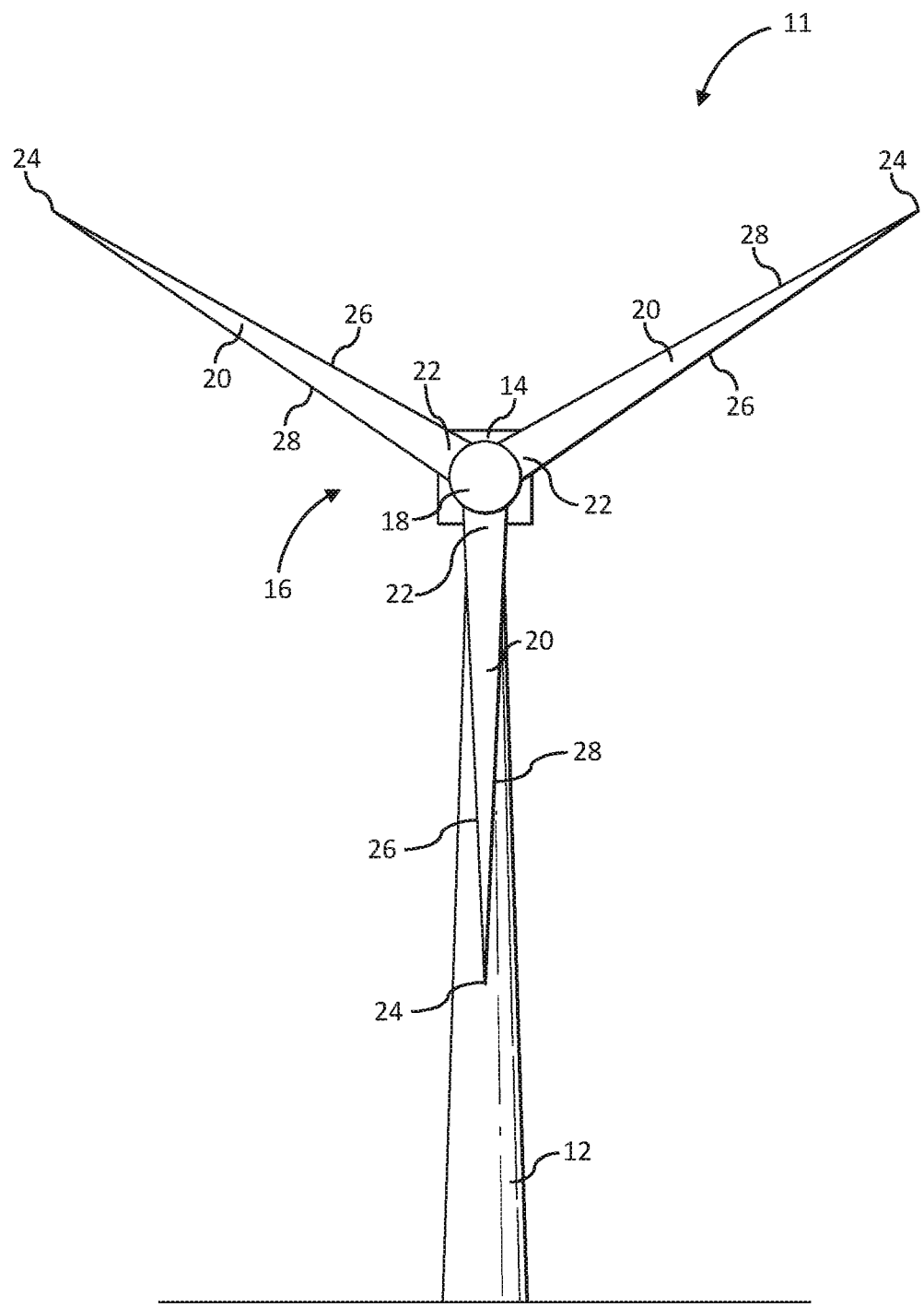
FIG. 1 is a schematic view of a wind turbine comprising a plurality of wind turbine blades according to an example of the present invention.

FIG. 1 shows a wind turbine 11 according to an embodiment of the present invention. The wind turbine 11 comprises a tower 12, a nacelle 14 arranged at an upper end of the tower 12, and a rotor 16 mounted to the nacelle 14. The rotor 16 comprises a hub 18 and a plurality of wind turbine blades 20. In this example the rotor 16 comprises three blades 20, but in other embodiments the rotor 16 may have any number of blades 20.

Each blade 20 extends in a longitudinal or 'spanwise' direction from a root end 22 to a tip end 24, and in a transverse or 'chordwise' direction between a leading and a trailing edge 26, 28. The root end 22 of each blade 20 is attached to the hub 18 via a pitch-drive mechanism (not shown), which allows the blade 20 to be turned about a pitch axis to vary its angle of attack.

Figure 2:
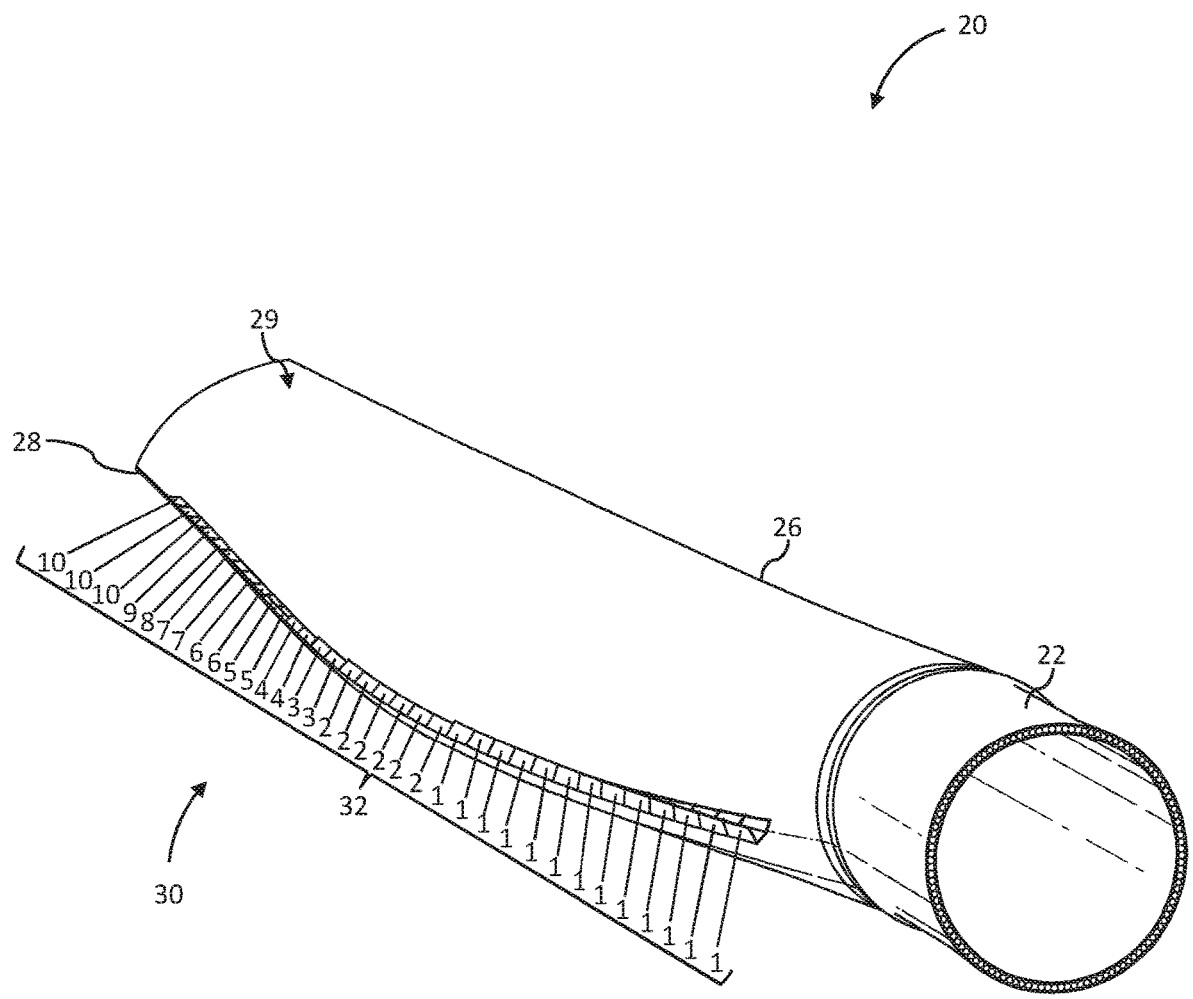
FIG. 2 is a perspective view of a root end of a wind turbine blade and shows a device according to an example of the present invention mounted to a trailing edge of the blade in a plurality of adjacent sections.

FIG. 2 shows an inboard portion of a wind turbine blade 20 according to an embodiment of the present invention. The inboard portion of the blade 20 includes the root end 22. As shown in FIG. 2, an aerodynamic device 30 is mounted to an outer surface 29 of the blade 20 along the trailing edge 28 of the blade 20. The aerodynamic device 30 in this example is a trailing edge flap, i.e. a so-called 'Gurney flap'. The device 30 is provided in a plurality of sections 32, which are mounted end-to-end (or side-by-side) along the trailing edge 28 of the blade 20. The sections 32 are arranged in such a way as to follow the contour of the trailing edge 28, which in this example has a double curvature.

Each section 32 of the Gurney flap 30 may have the same shape and/or size as an adjacent section 32, or it may have a different shape and/or size. In this example, there are ten different designs of Gurney flap sections 32, each having a slightly different geometry. The sections are numbered 1-10 in FIG. 2. In this particular example, thirteen 'type-1' sections 1 are mounted adjacent to one another closest to the root 22 of the blade 20. Six 'type-2' sections 2 are then mounted adjacent to one another outboard of the 'type-1' sections 1. Two 'type-3' sections 3 are mounted outboard of the 'type-2' sections 2, and so on. Generally speaking, the Gurney flap sections 32 increase in size towards the root 22 of the blade 20.

Whilst in this example the Gurney flap 30 is provided on the inboard part of the blade 20, in other examples it may be provided along a different spanwise portion of the blade 20, or it may extend along substantially the entire length of the blade 20. As a further alternative, the blade 20 may comprise a plurality of Gurney flaps 30 located, respectively, in different spanwise portions of the blade 20.

Figure 3:
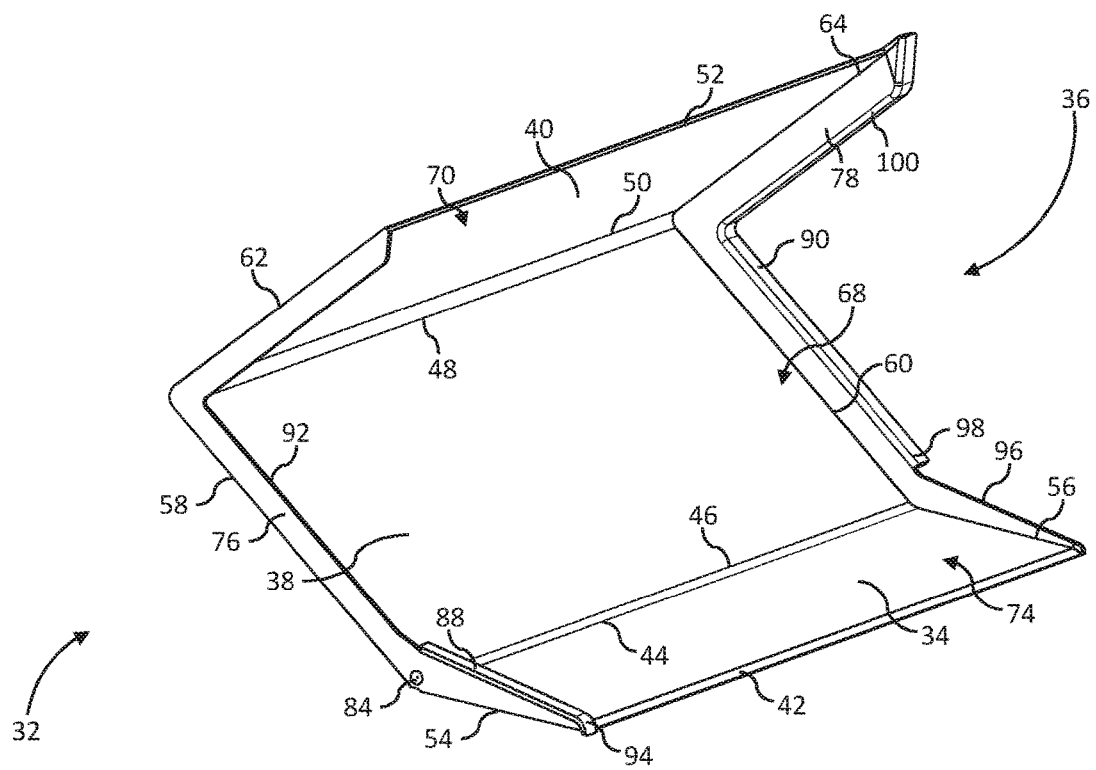
FIG. 3 is a front-perspective view of one section of the device.
Figure 4:
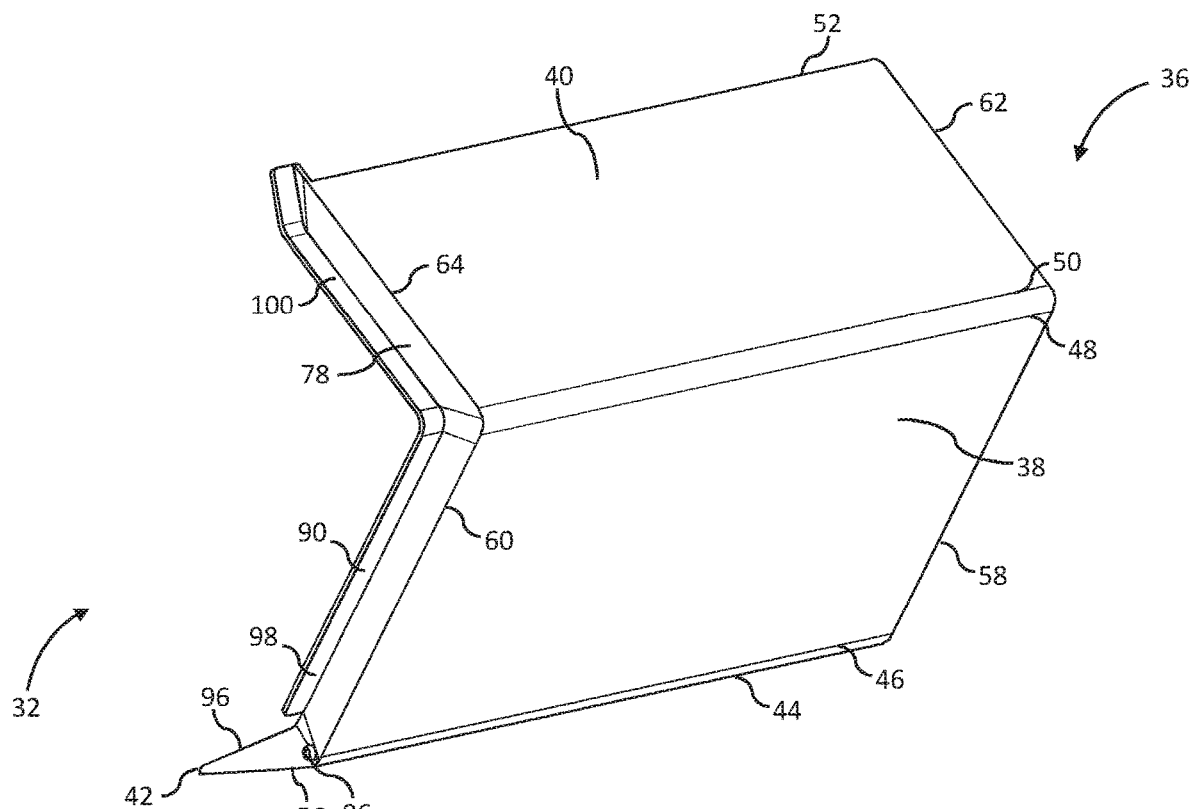
FIG. 4 is a rear-perspective view of said section of the device.

Referring now to FIGS. 3 and 4, which show a flap section 32 in isolation. FIG. 3 is a front perspective view of the flap section 32 and FIG. 4 is a rear perspective view. The flap section 32 is a moulded plastics component in this example, but it may instead be formed from other materials, e.g. metal such as aluminium, or composite materials, and using any other suitable manufacturing process such as 3D printing, casting etc.

The flap section 32 comprises a baseplate 34 for mounting to the wind turbine blade 20 and a flap 36, which extends from the baseplate 34. The flap 36 comprises first and second panels 38, 40. The first panel 38 extends from the baseplate 34 and the second panel 40 extends from the first panel 38. The first and second panels 38, 40 are arranged to form a V-shape in cross-section.

In this example the baseplate 34 and the two flap panels 38, 40 are all substantially flat and rectangular. In other embodiments the baseplate 34 and/or the flap 36 may have a different shape, and/or the flap 36 may have a different number of panels, for example one panel, or more than two panels.

The baseplate 34 and the two panels 38, 40 of the flap 36 each has first and second longitudinal edges 42, 44, 46, 48, 50, 52 and first and second transverse edges 54, 56, 58, 60, 62, 64. The transverse edges 54, 56, 58, 60, 62, 64 of the flap panels 38, 40 and the baseplate 34 are mutually aligned in this example. The first longitudinal edge 42 of the baseplate 34 is hereafter referred to as a 'leading edge', and the second longitudinal edge 44 of the baseplate 34 is hereafter referred to as a 'trailing edge'. When the baseplate 34 is mounted to the trailing edge 28 of the blade 20, the trailing edge 44 of the baseplate 34 is substantially aligned with the trailing edge 28 of the blade 20. The leading edge 42 of the baseplate 34 is chamfered to provide a smooth and aerodynamically-efficient transition between the surface 29 of the blade 20 and the baseplate 34.

The flap 36 extends from the trailing edge 44 of the baseplate 34. As shown in FIG. 3, the first longitudinal edge 46 of the first flap panel 38 is contiguous with the trailing edge 44 of the baseplate 34. The second longitudinal edge 48 of the first flap panel 38 is contiguous with the first longitudinal edge 50 of the second flap panel 40. In other embodiments the first longitudinal edge 46 of the first flap panel 38 may coincide with the trailing edge 44 of the baseplate 34. Likewise, the second longitudinal edge 48 of the first flap panel may coincide with the first longitudinal edge 50 of the second flap panel 40. Expressed in other terms, the first flap panel 38 may share a common edge with the baseplate 34, and/or the first flap panel 38 may share a common edge with the second flap panel 40.

Figure 7:
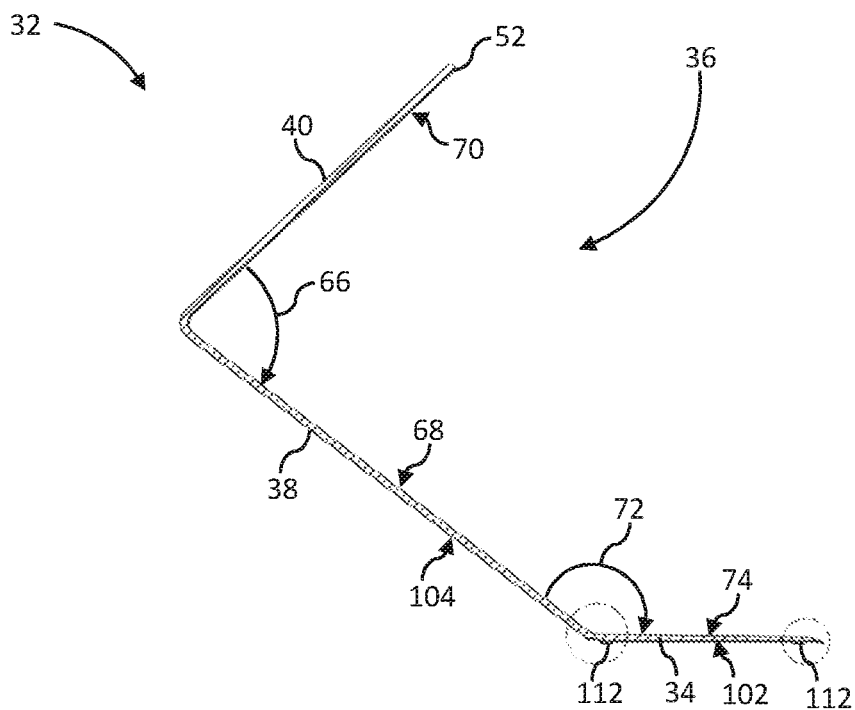
FIG. 7 is a cross-sectional view of the section of the device taken along the line 7-7 in FIG. 6.
Figure 8:
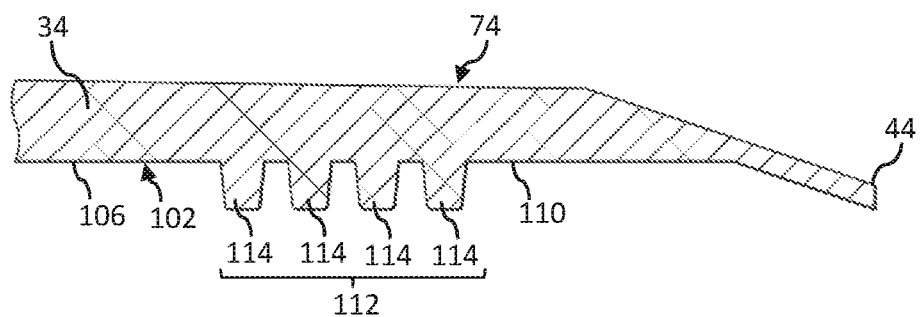
FIGS. 8 and 9 are enlarged views of portions of FIG. 7.

Referring to the cross-sectional view of FIG. 7, as mentioned above the first and second panels 38, 40 of the flap 36 together define a V-shape in cross-section. A first internal angle 66 is defined between respective inner surfaces 68, 70 of the first and second flap panels 38, 40. A second internal angle 72 is defined between an inner surface 74 of the baseplate 34 and the inner surface 68 of the first panel 38 of the flap 36. In this example the first internal angle 66 is an acute angle, but in other examples the first internal angle 66 may be an obtuse angle or it may be substantially 90 degrees. The second internal angle 72 in this example is an obtuse angle, but in other examples it may be an acute angle or it may be substantially 90 degrees.

Referring again to FIGS. 3 and 4, the flap section 32 comprises first and second end walls 76, 78 provided respectively at first and second ends of the flap section 32. The end walls 76, 78 are contiguous with the transverse edges 54, 56 of the baseplate 34, and contiguous with the transverse edges 58, 60, 62, 64 of the flap 36. Each end wall 76, 78 is provided in a plane that is substantially perpendicular to the planes of the baseplate 34 and the flap 36. As shown in FIG. 3, the parts of the end walls 76, 78 that are contiguous with the baseplate 34 decrease in height moving from the trailing edge 44 of the baseplate 34 towards the leading edge 42. This provides an advantageously streamlined profile.

Each end wall 76, 78 of the flap section 32 is provided with a locating feature 84, 86 which locates with a locating feature on an adjacent flap section to facilitate alignment of adjacent flap sections during mounting to the blade 20. In this example, the first end wall 76 comprises a circular recess 84 (see FIG. 3), and the second end wall comprises a cylindrical projection 86 (see FIG. 4). The cylindrical projection 86 fits into a circular recess on an adjacent flap section during the mounting process. The locating features 84, 86 are provided substantially at the boundary between the baseplate 34 and the flap 36.

The first end wall 76 of the flap section 32 includes a first flange 88 and the second end wall 78 includes a second flange 90. These flanges 88, 90 are referred to hereafter as 'tabs'. The second tab 90 is transversely offset from the first tab 88, or in other words the two tabs 88, 90 are mutually offset in a transverse direction. As will be described in more detail later, the tabs 88, 90 form an interlock with tabs of an adjacent flap section when the flap sections 32 are mounted to the blade 20 and thereby prevent air leakage between adjacent flap sections in use.

In this example the first tab 88 extends from the first end wall 76. Specifically, the first tab 88 extends from an upper (free) edge 92 of the first end wall 76. The first tab 88 extends substantially from the part of the first end wall 76 that is contiguous with the baseplate 34. Due to the decreasing height of the first end wall 76 in the region of the baseplate 34, the first tab 88 is provided in a plane that is inclined relative to the plane of the baseplate 34 and spaced apart from that plane by the height of the first end wall 76 in the region of the baseplate 34. The first tab 88 extends longitudinally beyond the first transverse edge 54 of the baseplate 34. The first tab 88 has a curved end portion 94 near the leading edge 42 of the baseplate 34. This provides a smooth and aerodynamically-efficient interface between the blade surface 29 and the tab 88 when the flap section 32 is mounted to the blade 20.

In this example, the second tab 90 extends from the second end wall 78. Specifically, the second tab 90 extends from an upper (free) edge 96 of the second end wall 78. The second tab 90 extends substantially from the part of the second end wall 78 that is contiguous with the flap 36. The second tab 90 is substantially V-shaped in cross-section corresponding to the V-shaped arrangement of the two flap panels 38, 40. A first portion 98 of the second tab 90 is provided in a plane that is substantially parallel to the plane of the first flap panel 38 and spaced apart from that plane by the height of the second end wall 78. A second portion 100 of the second tab 90 is provided in a plane that is substantially parallel to the plane of the second flap panel 40 and spaced apart from that plane by the height of the second end wall 78. The second tab 90 extends longitudinally beyond the second transverse edges 60, 64 of the two flap panels 38, 40.

Further details of the flap section 32 will now be described with reference to FIGS. 5 to 9 in combination.

Figure 5:
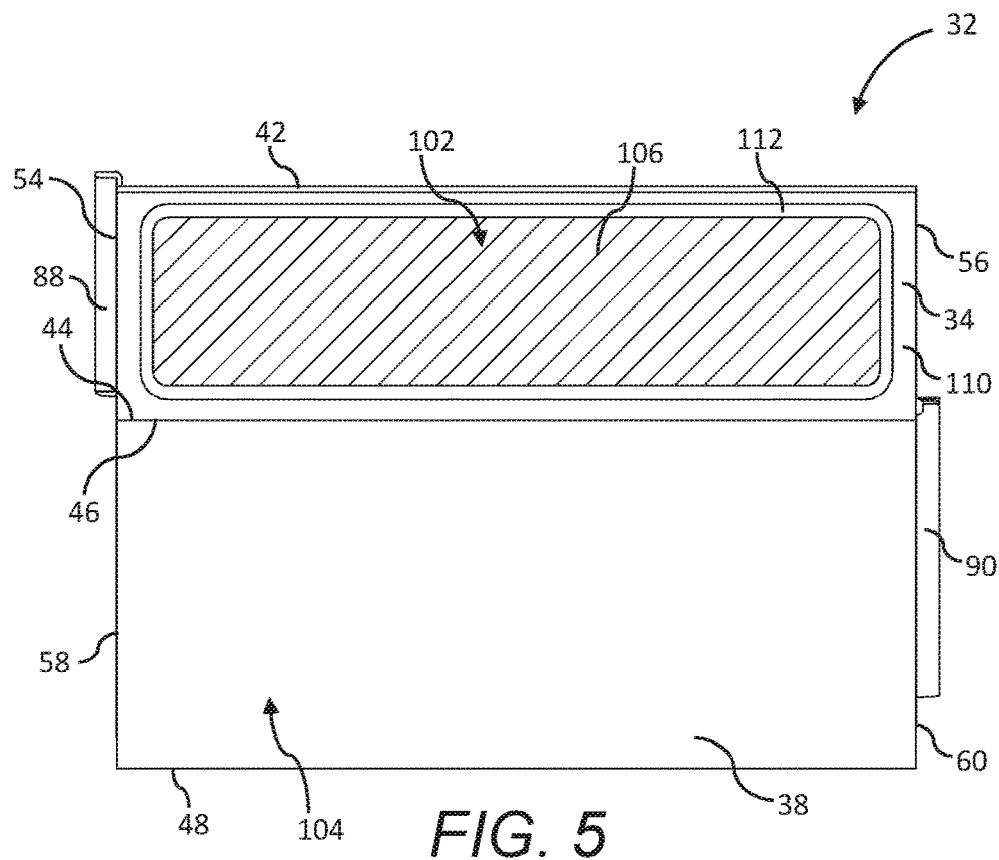
FIG. 5 is a bottom plan-view of said section of the device.
Figure 6:
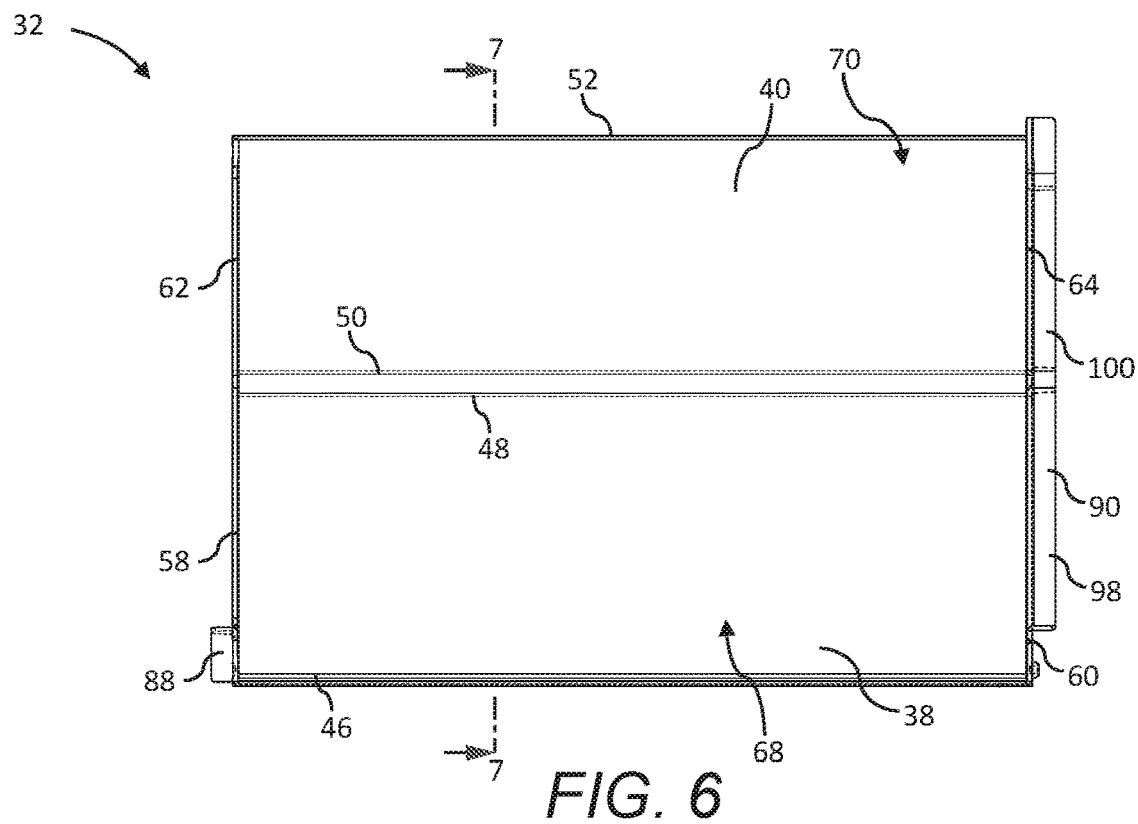
FIG. 6 is a front view of said section of the device.

FIG. 5 is a bottom view of the flap section 32 showing an outer surface 102 of the baseplate 34 and an outer surface 104 of the first flap panel 38, and FIG. 6 is a front view of the flap section 32, showing the inner surfaces 68, 70 of the two flap panels 38, 40.

Referring to FIG. 5, the outer surface 102 of the baseplate 34 comprises a mounting region 106. The mounting region 106 in this example is substantially rectangular and arranged inwardly of the longitudinal and transverse edges 42, 44, 54, 56 of the baseplate 34. The mounting region 106 is provided with an adhesive for mounting the flap section 32 to the wind turbine blade 20. The adhesive in this example is a layer of foam having a pressure-sensitive adhesive on both sides. Other suitable types of adhesive may be used, such as paste adhesive, two-part adhesives etc.

The outer surface 102 of the baseplate 34 also includes a sealing region 110, which surrounds the mounting region 106. During mounting of the flap section 32 to the blade 20, a wet sealant is provided between the sealing region 110 and the surface 29 of the blade 20. The sealant provides a weather tight seal around the adhesive in the mounting region 106 and protects the adhesive from exposure to moisture, dirt and other contaminants thus ensuring the integrity of the adhesive over the service life of the blade 20, which is typically upwards of twenty years.

The outer surface 102 of the baseplate 34 further includes a barrier 112, which is provided between the mounting region 106 and the sealing region 110. As shown in the cross-sectional view of FIG. 7 and in the enlarged views of FIGS. 8 and 9, the barrier 112 comprises a series of ridges 114. There are four ridges 114 in this example. The ridges 114 protrude from the outer surface 102 of the baseplate 34. The ridges 114 are integrally moulded with the baseplate 34 in this example. The ridges 114 serve to interrupt the flow of wet sealant towards the mounting region 106. The ridges 114 slow the progression of sealant towards the mounting region 106 to such an extent that the sealant cures before reaching the adhesive. This prevents the sealant from reaching the adhesive and thus prevents the adhesive bond between the blade 20 and the baseplate 34 from being compromised by the sealant. The ridges 114 effectively provide a tortuous path between the sealing region 110 and the mounting region 106. Further details of the barrier 112 and the sealing mechanism can be found in applicant's patent application WO2017/088880, the contents of which is hereby incorporated by reference.

Figure 9:
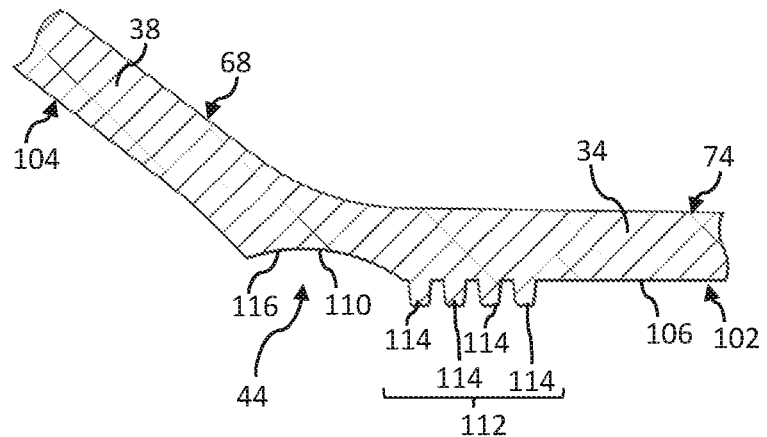

Referring to FIG. 9, here it can be seen that the sealing region 110 along the trailing edge 44 of the baseplate 34 (shown in FIG. 9) has a concave profile in cross-section. The concave profile forms a channel 116 between the baseplate 34 and the trailing edge 28 of the blade 20. Additional sealant can be provided in this channel 116 and this can be shaped to form a smooth transition between the blade surface 29 and the flap 36 during installation. The curved profile also advantageously facilitates locating the flap section 32 at the trailing edge 28 of the blade 20, as will be discussed later. It also reduces the material required for the flap section 32, resulting in a saving in weight and cost of materials. Furthermore, the curved profile can increase the flexibility of the flap section 32.

Figure 10:
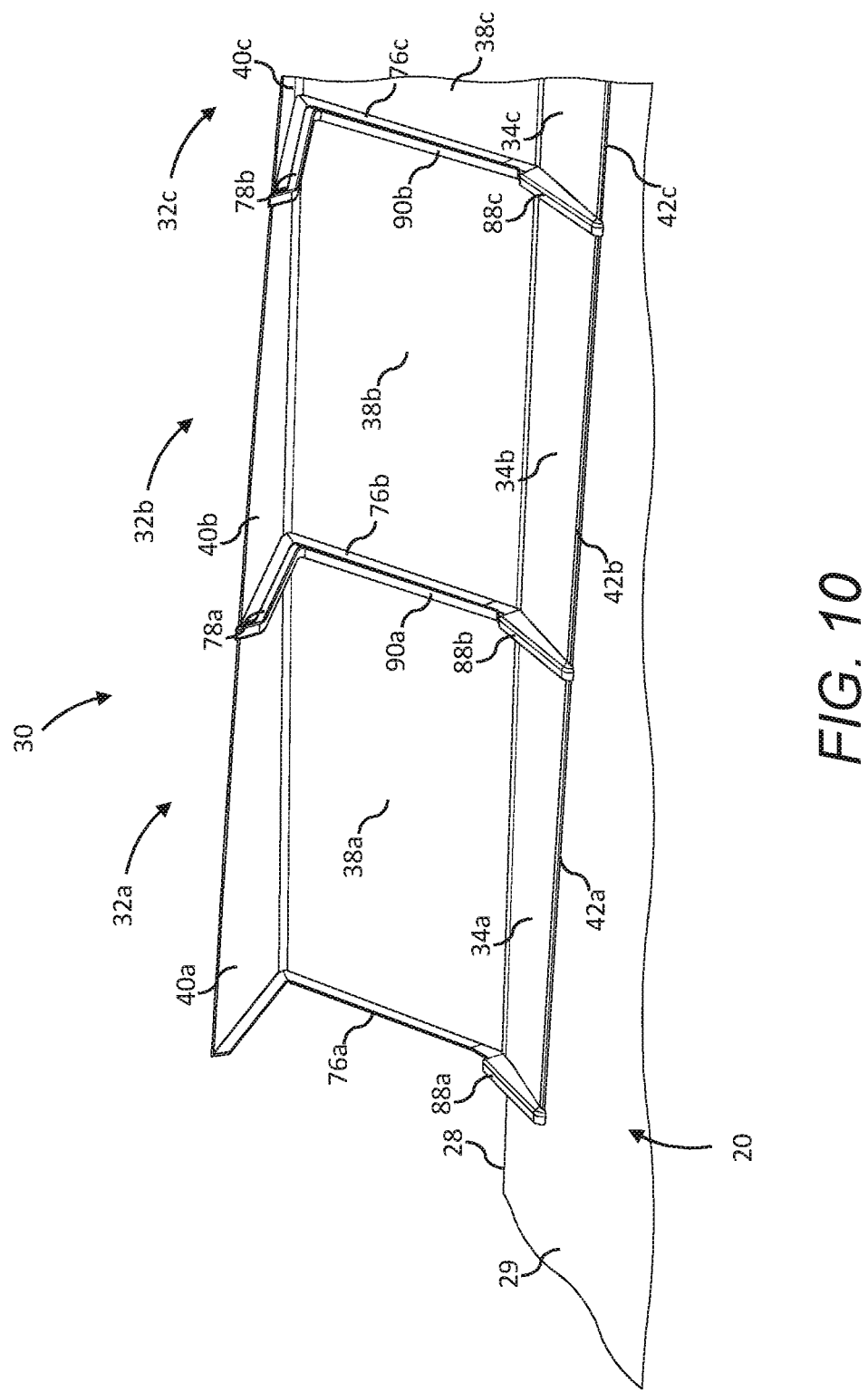
FIG. 10 shows three sections of the device mounted end-to-end to a surface of the blade.

Referring now to FIG. 10, this shows a series of flap sections 32a, 32b, 32c of the Gurney flap 30 arranged side-by-side (or end-to-end) and mounted to the pressure surface 29 of the blade 20 at the trailing edge 28. Specifically, FIG. 10 shows a central flap section 32b arranged between a leftmost flap section 32a and a rightmost flap section 32c. It can be seen that the first tab 88b of the central flap section 32b overlaps the second end wall 78a of the leftmost flap section 32a, whilst the second tab 90b of the central flap section 32b overlaps the first end wall 76c of the rightmost flap section 32c. Further, the first end wall 76b of the central flap section 32b is overlapped by the second tab 90a of the leftmost flap section 32a, whilst the second end wall 78b of the central flap section 32b is overlapped by the first tab 88c of the rightmost flap section 32c. The tabs 90a, 88b, 90b, 88c of adjacent flap sections 32a, 32b, 32c effectively interlock. The interlocking tabs 90a, 88b, 90b, 88c prevent any gaps occurring between adjacent flap sections 32a, 32b, 32c, and thereby avoid air from leaking between the flap sections 32a, 32b, 32c. The tabs 90a, 88b, 90b, 88c prevent a loss of power and avoid whistling noise associated with leaking air.

As discussed by way of background, it is important that the adhesive is not compromised during mounting of aerodynamic devices, such as flaps, to a blade. It is necessary to ensure precise positioning of the devices before the adhesive on the baseplate comes into contact with the blade surface. Once the adhesive is in contact with the blade surface, the device cannot be moved without compromising the adhesive. As will now be discussed below with reference to FIGS. 11-13, the provision of the tabs in two parts such that they interlock advantageously facilitates the process of mounting flap sections to the blades and allows the flap sections to be precisely positioned and mutually aligned before the adhesive is placed in contact with the blade surface, thereby avoiding the risk of the adhesive being compromised.

Figure 11:
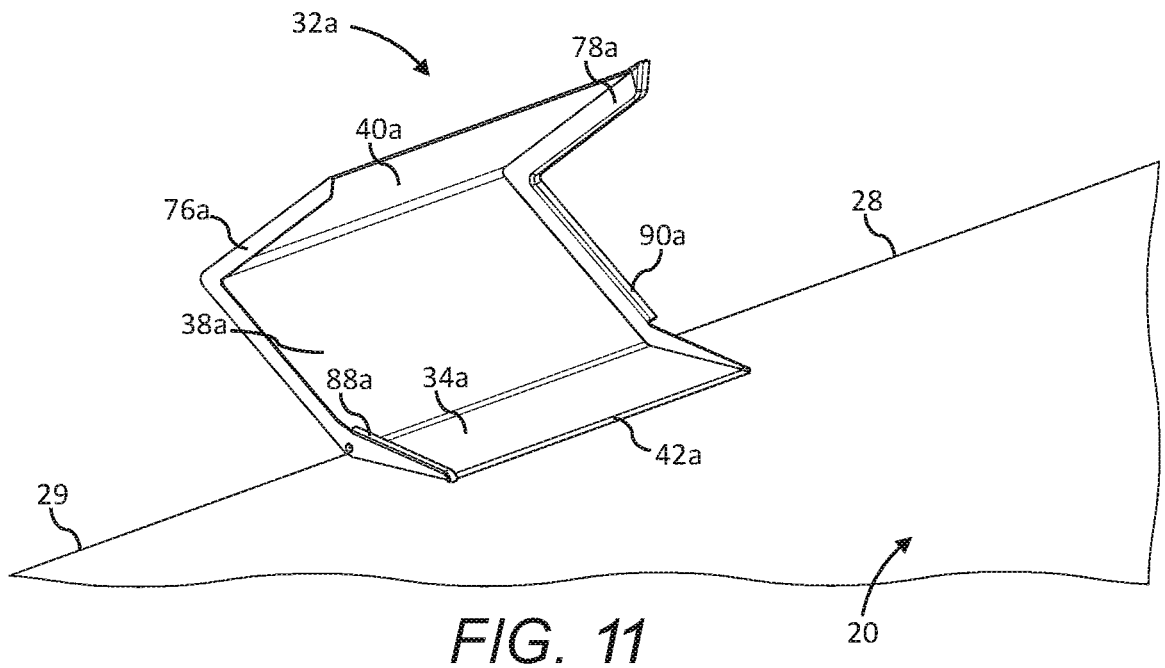
FIGS. 11 to 13 show a sequence of steps involved in mounting the sections to the surface of the blade.

Referring to FIG. 11, the process of mounting the Gurney flap 30 (see FIG. 2) to the blade 20 in this example commences with first attaching the most inboard flap section 32a to the blade 20. The most inboard flap section 32a is the flap section of the Gurney flap 30 that is closest to the root end 22 (se FIG. 2) of the blade 20. An adhesive foam pad is pre-attached to the baseplate 34a of the flap section 32a, and sealant is applied to the sealing region 110 of the baseplate 34 (referring to FIG. 5). The foam pad includes a protective film which is removed to expose the adhesive immediately prior to mounting the device 32a. The flap section 32a is then offered up to the pressure surface 29 of the blade 20 in the desired location at the trailing edge 28 and the baseplate 34a is pressed into contact with the pressure surface 29. The pressure-sensitive adhesive of the foam pad forms a strong bond with the pressure surface 29 of the blade 20 and the sealant is compressed in the sealing region 110. The barrier 114 (shown in FIGS. 5, 7, 8 and 9) prevents the sealant from coming into contact with the adhesive.

Figure 12:
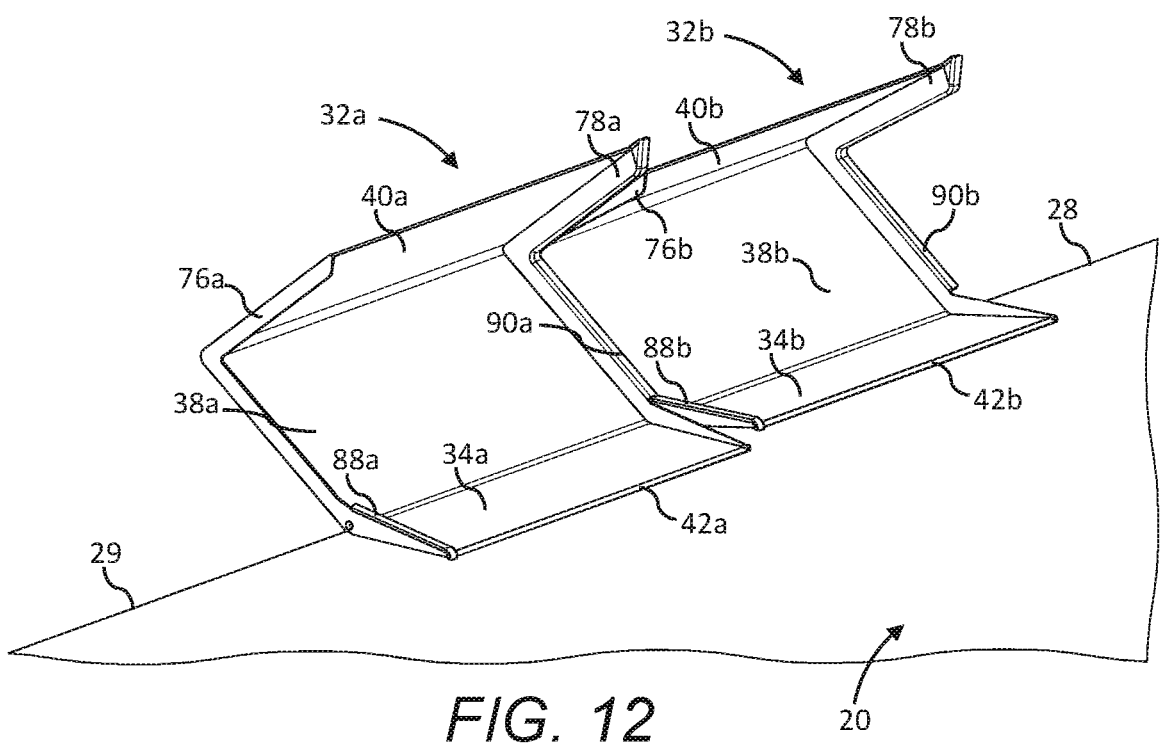

Referring to FIG. 12, the process continues with mounting a second flap section 32b adjacent to the first flap section 32a. The second flap section 32b is to be located on the tip-side of the first flap section 32a. Again, the protective film of the adhesive pad is removed and sealant applied to the sealing region 110 (refer to FIG. 5). Next, the concave-curved channel 116 at the trailing edge of the baseplate 34b (see FIG. 9) is located on the trailing edge 28 of the blade 20, and the locating features 84, 86 (see FIGS. 3 and 4) of the two flap sections 32a, 32b are located in mating contact. Specifically, the circular recess 84 (see FIG. 3) on the first end wall 76b of the second flap section 32b is engaged with the cylindrical projection 86 (see FIG. 4) on the second end wall 78a of the first flap section 32a. With the respective locating features 84, 86 of the first and second flap sections 32a, 32b in mating contact, the second flap section 32b is then precisely aligned with the first flap section 32a. The first end wall 76b of the second flap section 32b abuts, or is at least arranged close to, the second end wall 78a of the first flap section 32a. The two flap sections 32a, 32b are therefore arranged close together.

It is important to note that during the alignment process illustrated in FIG. 12, the second flap section 32b is inclined with respect to the first flap section 32a. Specifically, the baseplate 34b of the second flap section 32b is inclined relative to the surface 29 of the blade 20 such that the leading edge 42b of the baseplate 34b is spaced apart from the surface 29 of the blade 20. This ensures that the adhesive and sealant applied to the baseplate 34b of the second flap section 32b does not touch the surface 29 of the blade 20, thus avoiding comprising the adhesive and sealant on the second flap section 32b.

Figure 13:
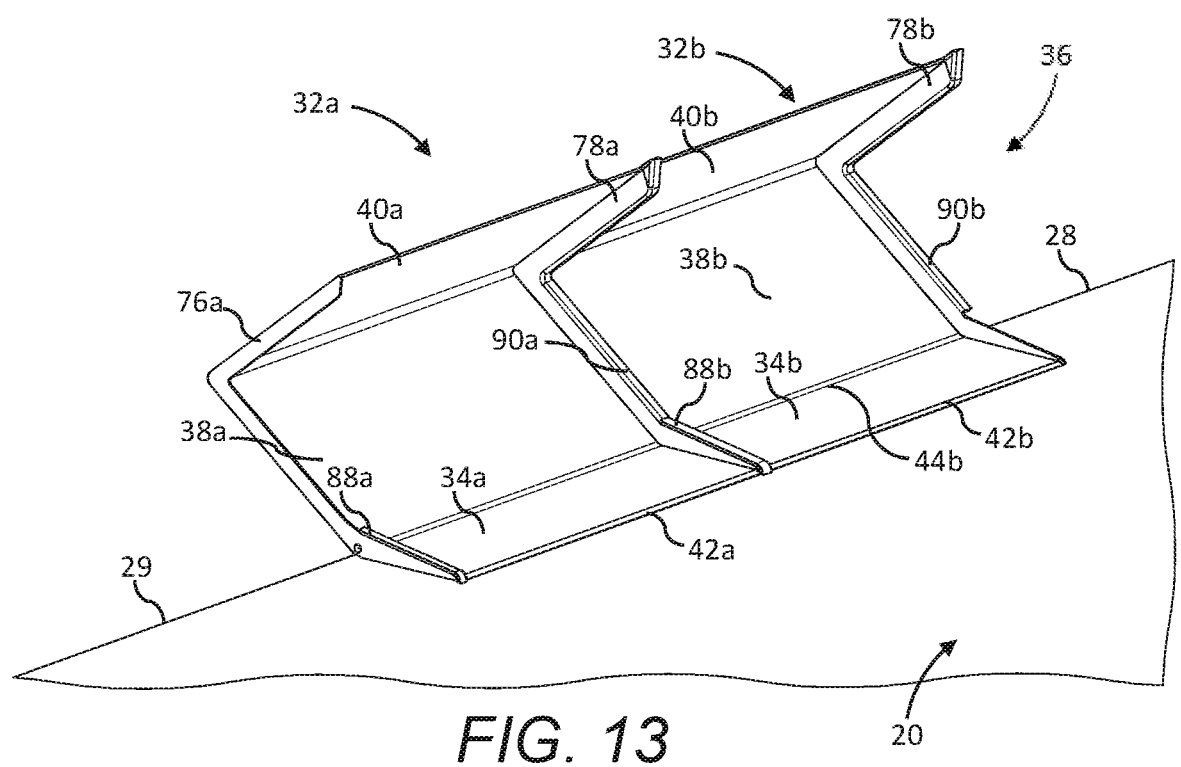

Referring now to FIG. 13, once the second flap section 32b has been aligned with the first flap section 32a, the second flap section 32b is then pivoted about the trailing edge 44b of the baseplate 34b. This causes the leading edge 42b of the baseplate 34 to move towards the surface 29 of the blade 20. As the flap section 32b is pivoted, the adhesive pad and sealant on the underside of the baseplate 34b are pressed into contact with the pressure surface 29 of the blade 20. This completes the mounting process of the second flap section 32b, and further flap sections 32 are then mounted sequentially in the tip direction according to the same process.

Once the flap sections 32 have been mounted to the blade 20, sealant may then be applied on the rear surface of the sections 32 to seal any gaps. Specifically, sealant may be applied in the concave-curved channel 116 shown in FIG. 9. This channel 116 advantageously provides a space for sealant between the flap section 32 and the trailing edge 28 of the blade 20. Sealant may also be provided on the outer (rear) surfaces of the flap panels to seal any gaps between the rear surfaces of adjacent flap sections.

It can be seen in FIG. 13 that pivoting the second flap section 32b causes the first tab 88b of the second flap section 32b to overlap the second end wall 78a of the first flap section 32a, and the second tab 90a of the first flap section 32a to overlap the first end wall 76b (see FIG. 12) of the second flap section 32b.

The tabs 88b, 90a of adjacent flap sections 32a, 32b effectively form an interlock at the interface between the tab sections 32a, 32b. The tabs 88b, 90a substantially completely cover the interface between the two flap sections 32a, 32b. The interface is therefore covered by the tabs 88b, 90a both at the adjacent baseplates 34a, 34b and at the adjacent panels 38a, 40a, 38b, 40b of the flap 36. The interlocking tabs 88b, 90a close any gaps between the adjacent flap sections 32a, 32b on the inner surfaces of the flap sections 32a, 32b and prevent any leakage of air at this interface when the blade 20 is in use. The prevention of air leakage improves the performance of the flap 30, and hence improves the performance of the blade 20, avoiding power losses and preventing noise.

It will be appreciated from the above description that the provision of the tabs in two parts 88b, 90a that interlock allows the flap sections 32a, 32b to be positioned close together without compromising the adhesive. This is because the two-part tabs 88b, 90a allow the flap sections 32a, 32b to be placed in abutment or close to each other before the baseplate 34 touches the blade surface 29. If, for example, a single tab having dimensions equivalent to the combined dimensions of the two tabs was provided only at one end of a flap section, then the tab would prevent the flap sections being positioned in close contact before the baseplate touches the blade surface. Mounting such flap sections would then necessitate the baseplate being placed in contact with the blade surface and the flap section would then need to be moved into abutment with the adjacent flap section, which would risk compromising the adhesive and sealant.

Referring again to FIG. 2, it can be seen that the trailing edge 28 of the blade 20 is curved in a chordwise direction. Depending upon the location of the Gurney flap 30, the flap sections 32 may need to follow a curved path at the trailing edge 28. It may therefore not always be possible for the flap sections 32 to be positioned in contact across the entire extent of their adjacent end walls 76, 78. The tabs 88, 90 may advantageously have sufficiently-large dimensions to cover any size of gap between adjacent end walls 76, 78 of the flap sections 32 when the flap sections 32 are mounted to a curved trailing edge 28. The tabs 88, 90 also ensure that any gaps that might otherwise occur between flap sections 32 during use of the blade 20, for example caused by flexing of the flap sections 32, remain covered.

The specific examples described above are not intended to limit the scope of the invention, which is defined in the accompanying claims. Many variants and modifications may be made to the specific examples without departing from the scope of the claims. For example, the flap may be formed from a single panel instead of two panels in other embodiments, or it may be formed from more than two panels. The tabs may be arranged differently, for example the first and second tabs may be exchanged so that the first tab is located at the second end of the flap section and the second tab located at the first end. Similarly, the locating features may be exchanged or alternative locating features employed, although it should be appreciated that the provision of locating features is optional and not essential. The adhesive and/or sealant may be applied to the blade surface instead of, or in addition to, the baseplate.

Whilst the specific examples relate to a trailing-edge flap, the two-part tabs and associated mounting scheme may be employed with other types of blade add-on devices, e.g. performance-enhancing devices such as serrated trailing edge devices, or other blade add-ons that may be provided in a plurality of sections mounted to the blade.

The invention claimed is:

1. A device for attaching to a surface of a wind turbine blade, the device comprising a plurality of sections to be arranged end-to-end along a portion of the blade, wherein each section of the device comprises:
   a baseplate for bonding to the surface of the blade;
   a first panel extending from the baseplate;
   first and second end walls extending respectively along transverse edges of the baseplate and the first panel;
   a first tab extending from the first end wall; and
   a second tab extending from the second end wall, the second tab being transversely offset from the first tab,
   wherein the tabs are arranged such that when the sections are positioned end-to-end with a first end wall of a first section adjacent to a second end wall of a second section, the first tab of the first section overlaps the second end wall of the second section, whilst the second tab of the second section overlaps the first end wall of the first section.

2. The device of claim 1, wherein the device is a trailing edge flap.

3. The device of claim 2, wherein one or more of the sections further comprises a second panel extending from the first panel, wherein the first and second panels form a V-shape in cross-section.

4. The device of claim 3, wherein the second tab is substantially V-shaped in cross-section.

5. The device of claim 1, wherein at least a portion of the first tab extends from a portion of the first end wall that is contiguous with the baseplate and at least a portion of the second tab extends from a portion of the second end wall that is contiguous with the panel(s).

6. The device of claim 1, wherein at least a portion of the first tab is provided in a plane that is inclined relative to the plane of the baseplate.

7. The device of claim 1, wherein at least a portion of the second tab is provided in a plane that is substantially parallel to, and spaced apart from, the plane of the first panel.

8. The device of claim 7, wherein a portion of the second tab is provided in a plane that is substantially parallel to, and spaced apart from, the plane of the second panel.

9. The device of claim 1, wherein the first tab has a curved end portion near a leading edge of the baseplate.

10. The device of claim 1, wherein the baseplate comprises an outer surface defining a mounting region for adhesively bonding to the surface of the blade, a sealing region at least partially surrounding the mounting region, and a barrier between the mounting region and the sealing region.

11. The device of claim 10, wherein the barrier comprises a ridge or a series of ridges.

12. The device of claim 1, wherein a rear surface of each section includes a longitudinally-extending channel at the boundary between the baseplate and the first panel.

13. The device of claim 1, wherein each section further comprises a first locating feature on the first end wall and a second locating feature on the second end wall, the first locating feature being configured to locate with the second locating feature of an adjacent section and the second locating feature being configured to locate with the first locating feature of an adjacent section.

14. A wind turbine blade comprising the device of claim 1 bonded to an outer surface of the blade.

15. A method of mounting the device of claim 1 to a surface of a wind turbine blade, the method comprising:
provproviding first and second sections of the device;
bonding the first section of the device to the outer surface of the blade;
providing adhesive and/or sealant on an outer surface of the baseplate of the second section and/or on the outer surface of the blade;
locating the second section of the device adjacent to the first section such that adjacent end surfaces of the first and second sections are in contact or close together and the second section is inclined relative to the first section such that the baseplate is not in bonding contact with the outer surface of the blade; and
pivoting the second section such that the baseplate is moved into bonding contact with the outer surface of the blade,
wherein pivoting the second section causes the first tab of the first section to overlap the second end wall of the second section, and the second tab of the second section to overlap the first end wall of the first section.

* * * * *